United States Patent [19]

Kellenberger

[11] Patent Number: 5,400,516

[45] Date of Patent: Mar. 28, 1995

[54] HOLDER AND STAND FOR PLUMB FINDER RULER AND SURVEYOR'S ROD

[76] Inventor: Ernest C. Kellenberger, 1604 Avenue 80, Algona, Iowa 50511

[21] Appl. No.: 74,366

[22] Filed: Jun. 10, 1993

[51] Int. Cl.⁶ ............................................. G01C 15/06
[52] U.S. Cl. ........................................ 33/295; 33/299; 248/169
[58] Field of Search .............. 33/293, 295, 296, 299; 248/169, 171; 354/293; 182/169

[56] References Cited

U.S. PATENT DOCUMENTS

| | | | |
|---|---|---|---|
| 1,139,990 | 5/1915 | Merrill | 182/169 |
| 1,217,713 | 2/1917 | Cotter | 182/169 |
| 3,110,109 | 11/1963 | Brittenham et al. | 33/293 |
| 3,570,130 | 3/1971 | Boehm | 33/295 |
| 4,290,207 | 9/1981 | Browning et al. | 33/295 |
| 4,378,638 | 4/1983 | Harder | 33/293 |
| 4,767,090 | 8/1988 | Hartman et al. | 354/293 X |

FOREIGN PATENT DOCUMENTS

| | | | |
|---|---|---|---|
| 2566116 | 12/1985 | France | 33/295 |
| 23237 | 8/1883 | Germany | 33/293 |
| 364986 | 12/1922 | Germany | 33/293 |

*Primary Examiner*—Alvin Wirthlin
*Attorney, Agent, or Firm*—Lucas J. De Koster

[57] ABSTRACT

An adjustable stand developed to facilitate an accurate measurement of vertical distances from a surface, on which at least one leg of the stand rests to a given point above that surface. The surface may be either ground surface or a surveyor's hub on a stake. The stand has two legs one leg of which is both a distance measuring device and a plumb finder by which the verticality of the leg may be ascertained. The second leg is formed of two spaced apart beams to provide stability, the beams having pointed ends for insertion into the surface on which the device stands.

8 Claims, 2 Drawing Sheets

HOLDER AND STAND FOR PLUMB FINDER RULER AND SURVEYOR'S ROD

BACKGROUND AND SUMMARY OF THE INVENTION

This invention pertains to devices particularly useful where vertical measurements are necessary such as in road building and similar construction where a paving string is required to be held at a certain vertical distance above surveyor's stakes or hubs, or in surveying where the surveyor's rod must be held vertically.

Before paving a road with a hard surfacing material either concrete or asphaltic cement, the level of that surface is accurately surveyed using carefully calibrated instruments. The level thus set is converted into measurements indicating the distance above ground level at various stations along the road. The surveyor then sets a stake called a hub at a fixed distance from the edge line of the paving and a nail or the like set at a given level. Above that level, a line called a string line is set. The line is at a fixed horizontal and vertical distance from the edge of the paving. Those distances are set by the machine which lays the pavement. This line is stretched tautly between those stations at proper level in order to determine what the level of the surface of the paving material should be.

The paving string line is connected between stakes to which the string has been fastened at the proper distance above the surface. However, in order to be as accurate as possible, the distance above the surface should be measured on a vertical line because the surveys are conducted based on vertical measurement. Currently, many road top milling machines, particularly those used for ground surface milling, and paving machines operate from such string lines. Usually a single line is necessary for the milling machine, although dual lines are usually used by paving machines. These lines are attached by longitudinal extensions to a stake set some distance from the edge of the new surface.

Currently, the determination of distance above the surface is determined by having one worker hold a measuring device in as close to a vertical position as possible while another positions the paving string. By using the present invention, a single worker can set this holding stand and plumb finder, and then by bending over or kneeling down while the plumb finder is held by the holder device that same worker can adjust the horizontal extension on its stake to fasten the string at the proper level, thus avoiding the need for a second worker and saving the contractor a substantial extra expense by reducing the time necessary for this function, and increasing the accuracy of the string level.

Similarly in the process of surveying, the surveyor's rod is normally held by one person while another uses the instrument. In order to achieve a vertical position, the rod holder, except in unusual circumstances, is required to rock the rod back and forth to acquire an accurate measurement. Use of the device of the current invention will assure accuracy without requiring assistance of a person to hold the rod, or, if the assistant is present, the process of rocking the rod is unnecessary.

DESCRIPTION

Figure 3:
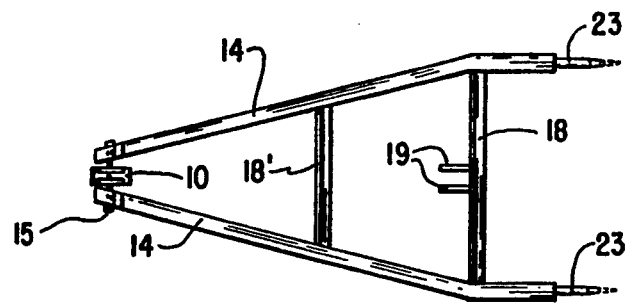
FIG. 3 is a top view of the holder as shown in FIG. 1.

Briefly this invention comprises a standing holder adapted to hold a distance measuring device such as an engineer's rule or a surveyor's rod, on a surface and extending vertically therefrom.

More specifically and referring to the drawings (FIGS. 1–4), the holder is basically a stand having two legs. One leg 10 of the stand is in fact a plumb-finding device which holds bubble chambers 11 adapted to indicate when these chambers are horizontal. The chambers are placed so that their axes are perpendicular to a flat surface of the leg 10. Therefore, that surface can be placed in a vertical position as measured by the horizontal position of the bubble chamber 11. For use in setting a paving line, a measuring scale 12 may be scribed in or a device such as an engineer's rule may be affixed to the flat surface of the leg 10 so that the distance above the point on the surveyor's hub on which the leg 10 is set can be readily seen on the scale 12. Preferably this scale is graduated in centimeters or hundredths of a foot, depending on the measurement used by the surveyor.

The second leg of the stand is composed of spaced beams 14 pivoted to the first leg 10 at one end by a bolt or a pin 15. Because the proposed plumb finder is in the form of a double channel, it is desirable to fill both channels near the pivot with blocks 16 both to provide a broader bearing for the pin 15 and to strengthen the device at this point.

Figure 2:
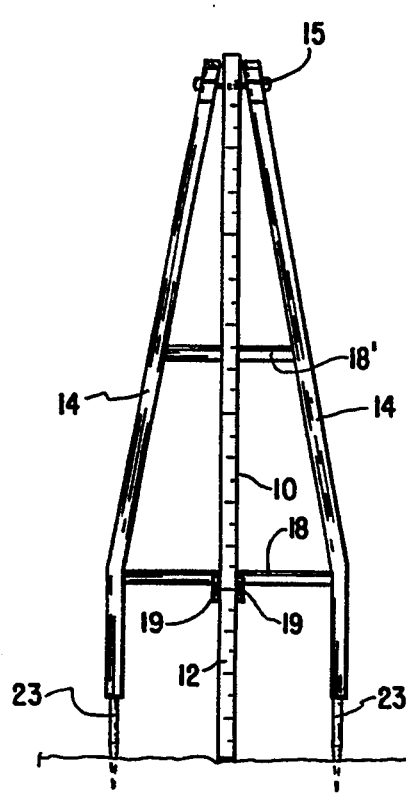
FIG. 2 is a front elevational view of the holder of FIG. 1.
Figure 1:
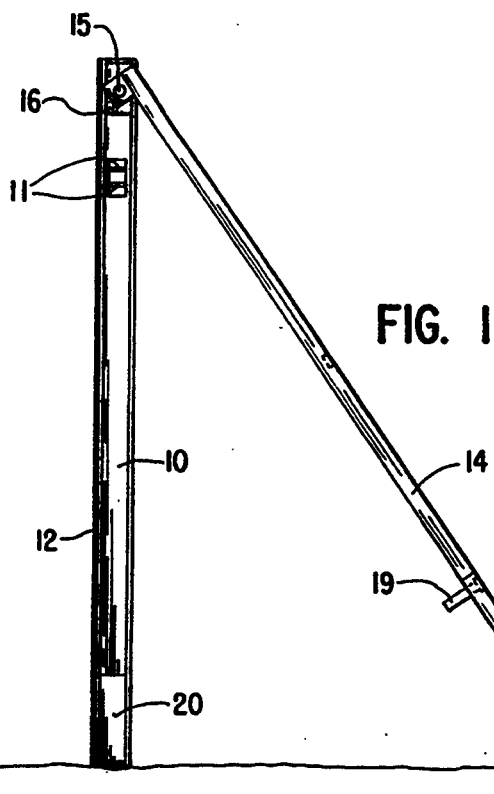
FIG. 1 is a side elevational view of the holder set for use.
Figure 4:
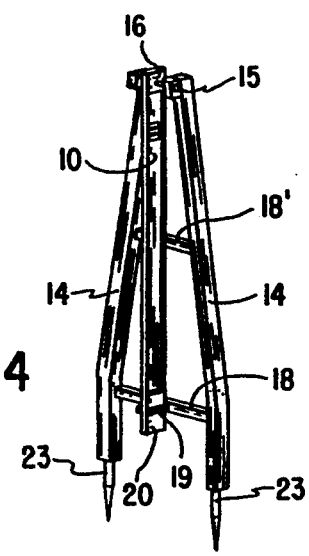
FIG. 4 is a perspective view of the device collapsed for carrying.

The beams 14 lie at an angle to each other and to the leg 10 as best shown in FIG. 2 and are held in spaced relation by cross members 18 and 18'. The member 18 carries a pair of springable fingers 19 adapted to embrace the leg 10. Blocks 20 extending to the end of the leg are provided also at this point to fill the channels of the plumb finder. These blocks provide a frictional contact surface to hold the legs together in the position of FIG. 4 for transport. They also provide a broader area at the lower end of the leg 10 so that there will be less wear by abrasion as that end is repeatedly set down on a road surface or on the surveyor's hub.

The lower end of each beam 14 is provided with a pointed shaft 23. These shafts may be poked into the ground to provide added vertical stability for the assembly.

In use in establishing the string position, the leg 10 is placed on the surveyor's hub from which the height of the line is to be measured. The second leg is pulled slightly beyond the vertical as indicated by the bubble chambers 11 and then pressed back so that the pointed shafts 23 stick into the ground. The points are pressed in until the bubbles in the chambers 11 indicate the leg 10 is vertical. At that point the line can be adjusted to the proper height by the same person who set the stand thus avoiding the need for one person to hold the scale while a second person pulls up the line, thus saving time and labor cost. Further, because the stand is accurately fixed, the measurement is as accurate as possible because the assembly has been set to a plumb position.

When the line is pulled up and fastened at one station, the device can be collapsed and readily taken to the next station and the procedure repeated.

Figure 5:
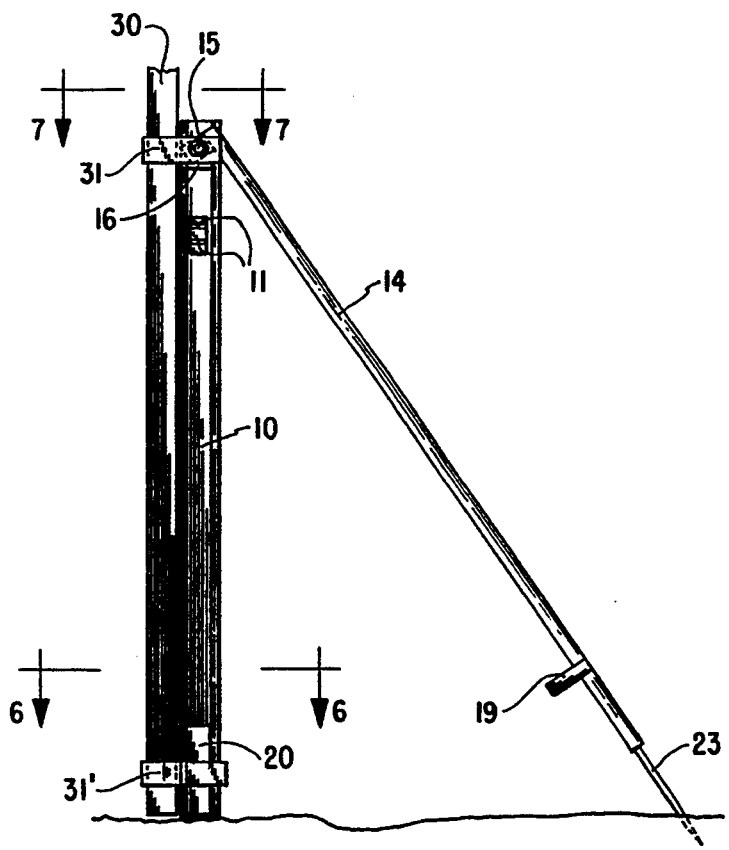
FIG. 5 is a view similar to FIG. 1 showing an alternative use of my holder, stand and plumb finder.
Figure 6:
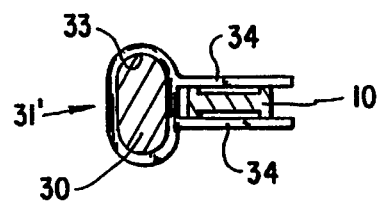
FIG. 6 is a sectional view from line 6—6 of FIG. 5, showing a bottom clip.

For use as a holder and stand for a surveyor's rod, I envision using the exact same stand and clipping a surveyor's rod 30 to the vertical leg 10, as shown in FIG. 5. Clips 31 and 31' may be used for that purpose. These clips may be of various types, but are adapted to encircle or nearly encircle the rod 30 at least far enough to hold the rod in alignment with the leg 10.

The bottom clip 31' is preferably formed as a socket 33 adapted to fit snugly around the rod 30. To that end, it may be lined with felt or rubberized material. It should be of the same shape as the bottom of the rod 30, so that the rod can be slipped into the socket. Accurately placed springable fingers 34 adapted to embrace the leg 10 are provided to hold the socket adjacent the leg 10.

The upper clip 31 may be similar to the lower, although that may result in a less convenient device since the clip would have to be slid up the rod to position. Further, because the rod would extend a considerable distance above the clip 31, there would be more tendency for the clip to slide off the leg. Therefore, a clip which can be fastened to the device by using the pivot bolt 15 is preferred.

Figure 7:
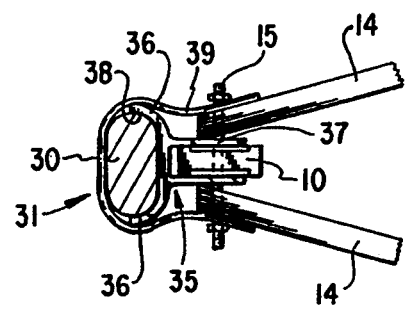
FIG. 7 is a sectional view from line 7—7 of FIG. 5, showing an upper clip.

Several different alternatives may be proposed. In FIG. 7, a clip 35 to be used as an alternate to the clip 31 is shown. This clip uses fingers 36 similar to those fingers 34 in the bottom clip except that the fingers are formed with holes 37 through which the bolt 15 can extend.

The clip itself may be formed with a socket 38 conforming to about half of the circumference of the rod 30 and then use a strap 39 extending around the rod to hold that rod in the socket. The strap is preferably a one-inch strap of soft aluminum of 1/16-inch thickness so that it can be formed to a close fit around the shapes and sizes of any of the various surveyor's rods or measuring rules as may be used. As an alternative, for rods or rules of lighter weights the strap may be permanently fixed at one end to the clip and use a pressure sensitive fastening material such as "Velcro" material to provide an adjustable fastening for the other end. Thus, the rod can be conveniently placed in and removed from the socket.

Figure 8:
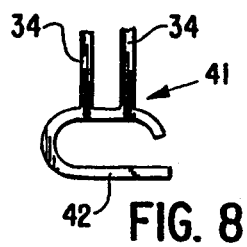
FIG. 8 is a top view of an alternate upper clip similar to that shown in FIG. 6.
Figure 9:
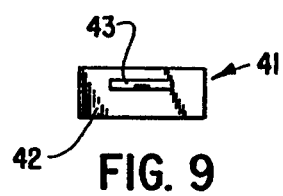
FIG. 9 is a front elevational view of the alternate clip shown in FIG. 8.

Another socket-type clip 41 is illustrated in FIG. 8 and 9. This clip 41 is similar to that shown in FIG. 7 in that it is supposed to be permanently held by the bolt 15. However, the socket is made of a springable material adapted to hold the rod in the socket by spring pressure of the outer portion 42 of the socket pressing the rod 30 into the shaped part of the socket. An advantage of this type of clip is that a bubble chamber 43 can be fixed to the face of the outer portion 42 to indicate verticality of the rod in the lateral direction in the same way as the chambers 11 indicate verticalness in a fore and aft direction. Another means for determining the complete verticality would be to use a circular chamber placed on the tip of the leg 10 although such chambers are less accurate and therefore somewhat less desirable.

It will be apparent that a secondary use of my stand is readily provided by this alternative embodiment of my invention.

I claim as my invention:

1. A measuring device adapted to measure the vertical distance from a surface to a point above that surface, comprising a stand consisting essentially of first and second legs, means on said first leg to indicate when the leg is vertically oriented, said second leg being pivotally attached to said first leg at the upper end of said first leg by pivot means engaged between said first leg and said second leg, the lower end of said second leg being pivotally moveable toward and away from the lower end of said first leg to adjust said first leg to a vertical position, said second leg being formed of spaced apart beams, said beams being joined together by transverse spacers thus forming a unitary second leg, and an indicator on said first leg to indicate the distance from said surface to a point vertically removed from said surface.

2. The measuring device of claim 1 in which springable fingers on one of said spacers is adapted to springably engage said first leg to retain said legs together for transportation.

3. The measuring device of claim 2 in which said first leg is of double-channel shaped cross section, block means filling said channels both at the point of said pivotal attachment and where said fingers engage said first leg.

4. The measuring device of claim 1 in which each beam has a pointed end opposite said pivotal attachment, said pointed ends being adapted to be pressed into said surface to hold said first leg in a vertical position.

5. The measuring device of claim 1 in which auxiliary measuring means is removably fastened to said first leg.

6. The measuring device of claim 5 in which said auxiliary measuring means is a surveyor's rod, clip means adapted to hold said rod to said first leg, said clip means including a first clip attachable to said first leg near the upper end thereof and a second clip attachable to said first leg near its lower end.

7. The measuring device of claim 6 in which said second clip includes a socket into which said rod fits, and adapted to completely surround said rod.

8. The measuring device of claim 6 in which said means on the first leg to indicate when the leg is vertically oriented is a first bubble chamber on one side of said first leg adapted to indicate verticality in a plane including said first leg and the centerline of the second leg defined by said spaced apart beams, and a second bubble chamber on the face of said first clip to indicate verticality in a plane substantially perpendicular to said first named plane.

* * * * *